Figure 3:
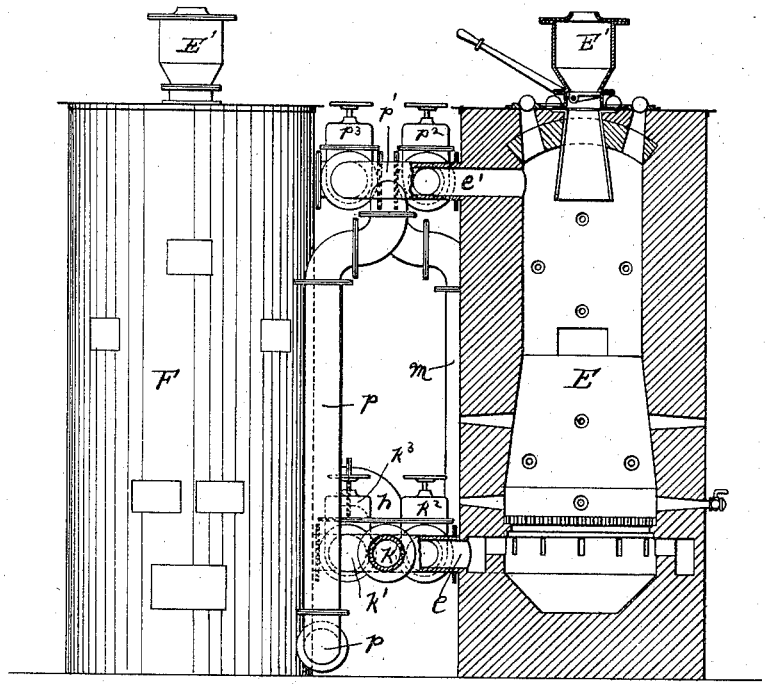

No. 612,462.
F. L. SLOCUM.
MANUFACTURE OF GAS.
(Application filed July 3, 1897.)
Patented Oct. 18, 1898.
(No Model.)
3 Sheets—Sheet 1.
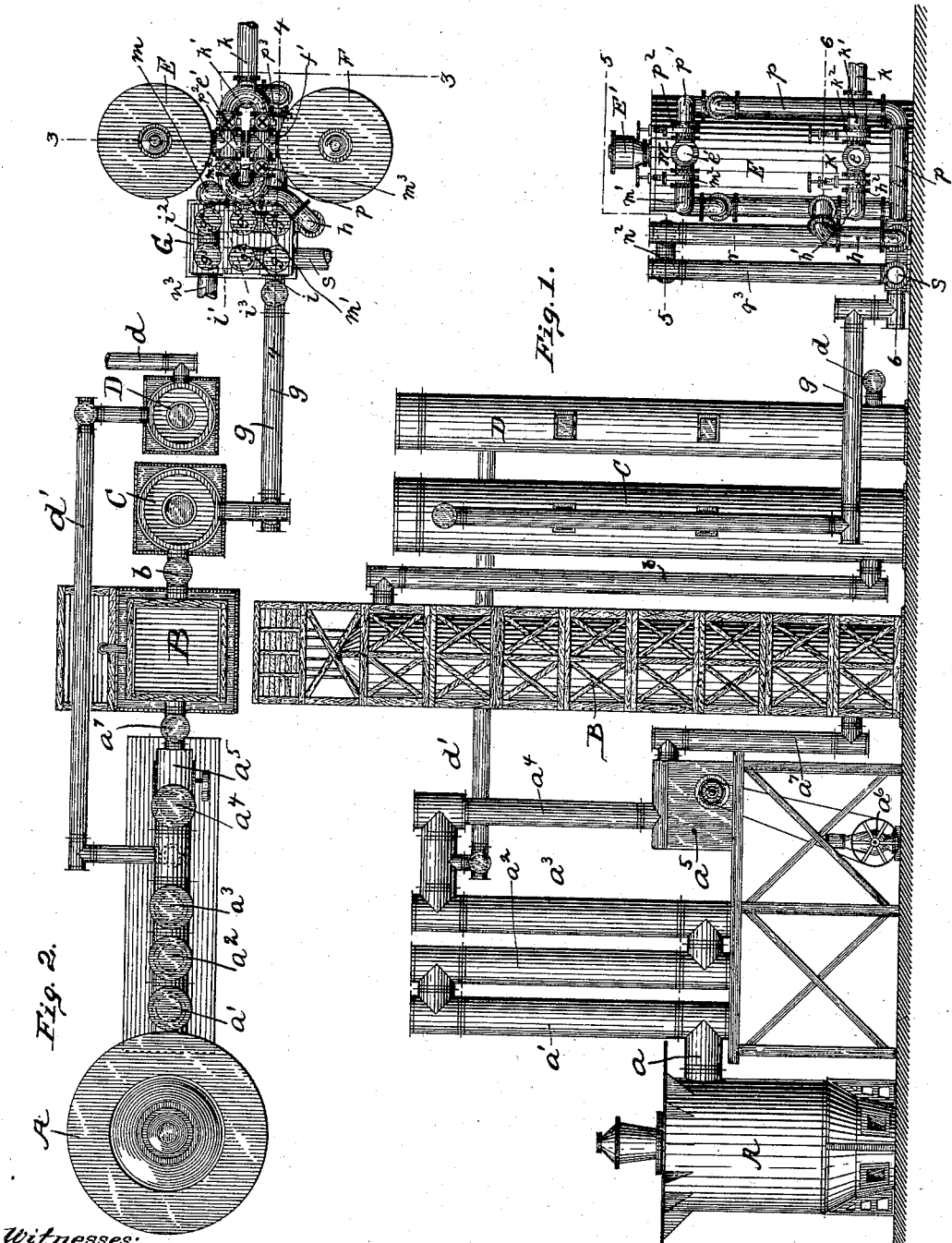

No. 612,462. Patented Oct. 18, 1898.
F. L. SLOCUM.
MANUFACTURE OF GAS.
(Application filed July 3, 1897.)
(No Model.) 3 Sheets—Sheet 2.

Witnesses:

Inventor:
Frank L. Slocum
By Kay & Totten
Attorneys

No. 612,462.  
F. L. SLOCUM.  
MANUFACTURE OF GAS.  
(Application filed July 3, 1897.)  
Patented Oct. 18, 1898.

(No Model.)  
3 Sheets—Sheet 3.

Witnesses:  
Inventor:  
Frank L. Slocum  
By Kay McTotten  
Attorneys

THE NORRIS PETERS CO., PHOTO-LITHO., WASHINGTON, D. C.

UNITED STATES PATENT OFFICE.

FRANK L. SLOCUM, OF PITTSBURG, PENNSYLVANIA.

MANUFACTURE OF GAS.

SPECIFICATION forming part of Letters Patent No. 612,462, dated October 18, 1898.

Application filed July 3, 1897. Serial No. 643,327. (No model.)

*To all whom it may concern:*

Be it known that I, FRANK L. SLOCUM, a resident of Pittsburg, in the county of Allegheny and State of Pennsylvania, have invented a new and useful Improvement in the Manufacture of Gas; and I do hereby declare the following to be a full, clear, and exact description thereof.

My invention relates to the manufacture of gas, its object being to provide for the recovery of the by-products from the greater portion of the fuel used in the generation of the gas, so as to cheapen the cost of the same and at the same time where the invention is employed in connection with the generator or producer gas to so bring up the efficiency of this class of gases after the separation of the by-products therefrom as to raise the gas to a high-quality gas—that is, one which has such a high percentage of combustible that it will burn without reheating and is therefore proper for distribution for domestic and like purposes.

The invention is well illustrated in connection with what is known as the "Mond" system of gas manufacture and will be described in connection therewith, though it is applicable for the treatment of other gases from which the by-products have been obtained.

The invention consists, generally stated, in first generating gas from a body of carbons, then separating the by-products therefrom, and then passing this gas so relieved from its by-products through a body of incandescent carbon to break up the steam or water vapor taken up by the gas in connection with the separation of the by-products therefrom and to reduce the carbonic acid of the gas to carbonic oxid, it being found that when this invention is applied to the Mond producer gas above referred to its efficiency is doubled and a gas produced of high heating power, much richer in hydrogen, and having the non-combustibles reduced from about sixty (60) per cent. of the gas to less than one-fourth ($\frac{1}{4}$) thereof, while the percentage of carbonic oxid is quadrupled.

The invention consists in certain other improvements, all of which will be hereinafter described and claimed.

To enable others skilled in the art to practice my invention, I will describe the same, referring to the accompanying drawings, in which—

Figure 4:
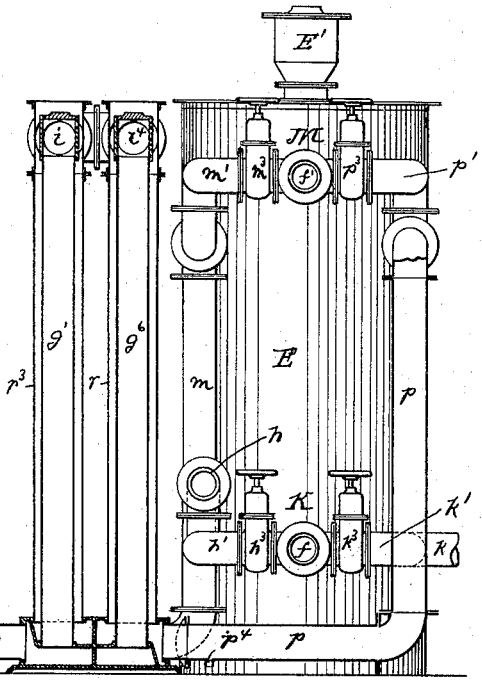
Figure 5:
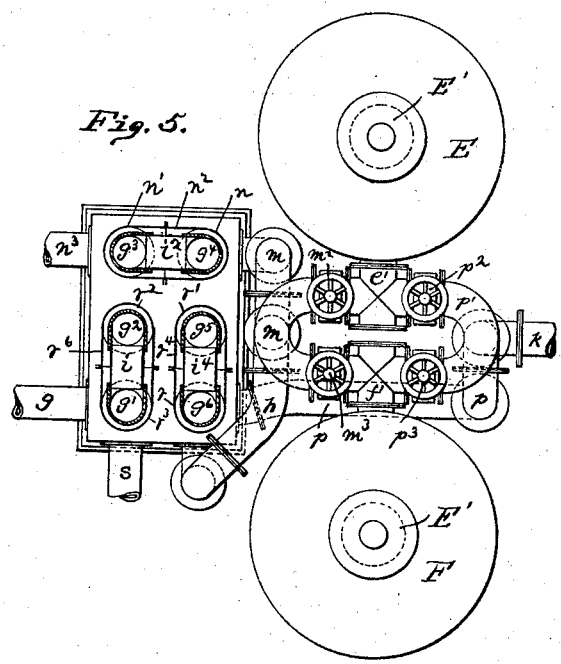
Figure 6:
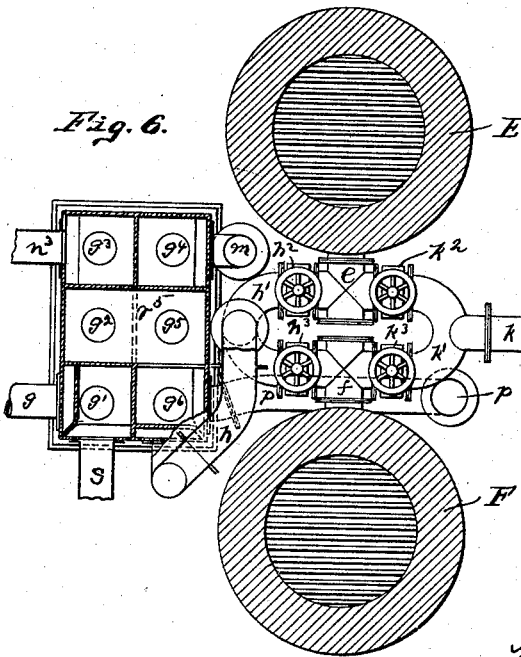

Figure 1 is a side view of the apparatus for practicing the invention, illustrating in connection with the same the ordinary Mond gas-producing apparatus. Fig. 2 is a top or plan view of the same. Fig. 3 is an enlarged vertical cross-section on the line 3 3, Fig. 2. Fig. 4 is an enlarged vertical longitudinal section on the line 4 4, Fig. 2. Fig. 5 is an enlarged cross-section on the line 5 5, Fig. 1. Fig. 6 is an enlarged cross-section on the line 6 6, Fig. 1.

Like letters of reference indicate like parts in each of the figures.

As the invention is intended principally to be practiced in connection with the making of Mond producer gas, I will describe the apparatus illustrated in the drawings and the general steps of the making of that gas, and will then describe the other steps in the carrying out of the process involved in the present case.

The principle of manufacture of Mond gas consists in the carrying back of the heat into the generator or producer in such a way that there is little loss of heat, while the air used for blasting up the producer and the steam or watery vapor carried by that air are both highly heated, so as to obtain as high efficiency of generator or producer gas as practicable, while the by-products are removed from the gases produced and are saved. The drawings illustrate the approved form of this apparatus, in which A is the producer, from which the gases pass through the pipe $a$, through a series of vertical return-pipes $a'$, $a^2$, $a^3$, and $a^4$ into the spray washer $a^5$, the usual Mond construction, such as illustrated in Patent No. 546,049 to L. Mond, dated September 10, 1895, being employed in connection with this pipe system, and the pipes $a'$ $a^2$ $a^3$ being formed of outer air-pipes inclosing inner gas-pipes, as illustrated in dotted lines, Fig. 2, so that while the gas is passing through these pipes the air traveling in the annular space between the two pipes will become heated and carry the heat back to the producer, the gas afterward passing through the separate spray washer $a^5$, in which the soot and some of the tar are separated therefrom and in which a cloud of spray is maintained by means of rotary beaters operated by a suitable engine, as at $a^6$. The gas then passes through the pipe $a^7$ into the acid-scrubber B, in which as the gases rise through the same the ammonia contained in the gases is absorbed by dilute sulfuric acid, the gases then passing by the pipe $b$ to the base of the scrubbing-tower C and rise in an upward course through the same, meeting in this course a current of cold water, which to some extent condenses the watery vapor taken up by the gas in the rotary scrubber $a^5$ and serves to separate all the tar from the gas, means being thus provided for the recovery of both the ammonia and the tar from the outgoing generator-gas. It might incidentally be stated that for the purpose of carrying back the heat so taken up by the water from the gas the water passing downwardly in the tower C is carried to the top of the air-heating tower D and descends through the same in opposite course to the incoming air, which enters through the pipe $d$ and rises through the tower D in contact with the water, the cold air absorbing the heat from the hot water and reducing it to proper temperature for again treating the gas while taking up a large portion of vapor therefrom and the air which thus becomes heated passing through the pipe $d'$ over to the return-pipe system between the generator A and the rotary scrubber $a^5$, where it communicates with the space between the outer and inner pipes, the air then passing around the outgoing gas and entering the producer, as above described.

The gas coming from this Mond producer after separation of the by-products therefrom of course contains a certain proportion of watery vapor. This gas can be used for many purposes in the arts, though it has not been found advantageous to transport it long distances, and therefore it has not had extended use for domestic consumption. This Mond gas system illustrates well the first steps of the present invention, which consists in generating the gas preferably by an air-blast and separating the by-products from the gas produced, and it is considered the best illustration of such first steps, because it provides for such a generating of the gas without the employment of too high heats, and therefore gives a greater proportion of by-products. Any other suitable system for these steps may of course be employed in making so-called "generator-gas" or other gas from which the by-products can be removed. The gas as so produced has generally a large proportion of carbonic acid and also contains a large volume of watery vapor or steam, taken up in the separating process, and by the other steps of the invention this gas is enriched and the watery vapor broken up, so as to produce a gas of high efficiency. For this purpose the apparatus illustrated in the drawings is preferred, and I will now describe the same in detail. It preferably consists of a series of gas-heating pipes to reheat the gas before it enters the cupola-generator and of two generators of suitable valve connections, so that when the gas is passing through one such generator to complete the process the other generator may be blasted up and the blast-gases used for heating up the gas before it enters the generator, while, further, as part of the system the finished gas itself after passing through the generator is utilized for heating the incoming gas in part of its course to the generator. For this purpose I employ the generators E F, which may be of the usual form of cupola-generator, having a suitable grate and suitable charging-hoppers, as at E′, none of such parts needing special description. I will first describe the gas-reheating system in its course as it leads to these generators and then the other steps of the process as practiced. Leading from the scrubber $c$ is the pipe $g$, which leads to the series of vertical return-pipes G, which, as shown, consists of six vertical pipes, the inner ones of which are marked $g'$, $g^2$, $g^3$, $g^4$, $g^5$, and $g^6$. The inlet-pipe $g$ leads to the base of the pipe $g'$, which is connected by a cross-pipe $i$ at its upper end to the cross-pipe $g^2$, the lower end of such pipe $g^2$ being connected in like manner, as illustrated in dotted lines, to the pipe $g^3$, as at $i'$, whose upper end communicates with the pipe $g^4$ at $i^2$, the lower end of the pipe $g^4$ communicating with the pipe $g^5$, as shown by dotted lines at $i^3$, the upper end of the pipe $g^5$ communicating with the pipe $g^6$ at $i^4$, while the lower end of the pipe $g^6$, communicating with the pipe $h$, leads to a point above the lower valve system K, communicating with the base of the two generators E and F. This system, which carries the gases into the lower ends of the generators, consists of the forked pipe $h'$, leading to the valves $h^2 h^3$, which communicate with the inlet-pipes $e$ and $f$, said pipes opening directly into the two generators. As the blast-gases also enter the lower ends of the generators, they must also lead to the entrance-pipes $e$ and $f$, and the construction employed is as follows: The blast-inlet $k$ communicates with the forked pipe $k'$, which in turn communicates with the valves $k^2$ and $k^3$, communicating with the pipes $e$ and $f$. The construction so provided enables the operator to direct the incoming gas into one or the other generator and to direct the incoming air into the generator through which the gas is not passing. For example, by opening the valve $h^2$ and closing the valve $k^2$ the gases are directed into the pipe $e^2$ and generator E, and at the same time by opening the valve $k^3$ and closing the valve $h^3$ the air-blast is directed into the generator F. The system then provides for the carrying of both the finished gases and the blast-gases in such course as will utilize these gases for heating the incoming gas from the Mond or other producer, and the arrangement is practically as follows: Opening from the upper end of the generators E and F are pipes $e'$ and $f'$, which communicate with a like valve system M, as the system K. For example, the pipes $e'$ $f'$ lead to valves $m^2$ $m^3$, which lead to forked pipe $m'$, from which the pipe $m$ leads to the annular pipes $n$ $n'$, formed around the gas-pipes $g^3$ and $g^4$, communicating with the annular space between the pipes $g^3$ and $g^4$ and $n$ and $n'$, and the finished gas leading from the generator passing from the pipe $m$ upwardly through the pipe $n$ and around the pipe $g^4$ and through the annular space between the cross-pipe $i^2$ and the cross-pipe $n^2$ and downwardly in the annular space between the inner or gas pipe $g^3$ and the outer pipe $n'$, passing out through the finished gas at the pipe $n^3$, from which it leads to the storage-tank. In like manner on the other side of the pipes $e'$ $f'$ are the valves $p^2$ $p^3$, leading to the forked pipes $p'$, which in turn communicate with the pipe $p$, which leads downwardly and then in a horizontal course to carry the blast-gases to the vertical return-pipes for heating the producer-gas. To carry these blast-gases around the pipes containing the incoming producer-gas, I employ the same kind of inclosing pipes as those above described, the pipe $r$ inclosing the gas-pipe $g^6$ and the pipe $r'$ inclosing the pipe $g^5$, the pipe $r^2$ inclosing the pipe $g^2$ and the pipe $r^3$ inclosing the pipe $g'$, these several pipes being connected by cross-pipes $r^4$, $r^5$, and $r^6$, surrounding the like connecting-pipes $i^4$ and $i'$. The pipe $p$ communicates with the annular space between the pipes $r$ and the gas-pipe $g^6$, and the gases then pass through the annular spaces formed by means of these sets of pipes around the pipes $g^5$, $g^2$, and $g'$ successively to the blast-gas outlet $s$. It thus appears that the heated finished gas is utilized for heating the incoming gas passing through the pipes $g^3$ and $g^4$, while the blast-gases are utilized for heating the incoming gas in the pipes $g'$, $g^2$, $g^5$, and $g^6$. To utilize all the blast-gases for this purpose, a suitable air-inlet $p^4$ may communicate with the blast-gas pipe $p$, so as to furnish sufficient oxygen for the combustion of these blast-gases. The blast-gases leading from the exit-pipe $s$ may be carried to any suitable steam-generator for generating the necessary steam for the running of the plant. With this apparatus the steps of the gas-making process not heretofore described are carried out as follows: Supposing that the generator E is blasted up and ready for passing the gas through the same, the valve $h^2$ is open and the valve $h^3$ closed, the valve $m^2$ open and the valve $m^3$ closed, and at the same time the valve $k^2$ closed and the valve $k^3$ open, and the valve $p^2$ is closed and the valve $p^3$ is open. As the Mond gases pass from the scrubbing-tower C after the removal of the by-products therefrom, they usually consist of about ten (10) per cent. carbonic oxid, twenty-seven (27) per cent. hydrogen, two (2) per cent. hydrocarbon gas, and about sixty (60) per cent. of non-combustible, consisting of nitrogen and carbonic acid. Other gases will of course differ in proportion of their elements; but any system where the gas is formed at the comparatively low temperatures necessary to obtain the by-products will contain a large proportion of non-combustible. In addition to this the gas contains a large volume of steam or watery vapor, as above stated. The gas and vapor pass in regular course from the pipe $g$ through the series of vertical pipes from $g'$ to $g^6$ successively, and then pass by the pipe $h$, forked pipe $h'$, valve $h^2$, and pipe $e$ into the generator E. The gases then pass upwardly through the generator E, escaping by the pipe $e'$, passing through the valve $m^2$, pipe $m'$, and pipe $m$. They pass through the annular space formed by the pipes $n$ and $n'$ around the pipes $g^3$ and $g^4$. At the same time the blast is being passed in the course above described through the generator F, and the blast-gases are carried through the pipe $p$ and burned and passed through the annular spaces formed by the pipes from $r$ to $r^3$ successively, extending around the other vertical return gas-pipes $g'$ $g^2$ and $g^5$ $g^6$. This course is followed continuously, changing the course of the gas and air, respectively, through one or the other generator E or F by the operation of the valves, as is found necessary with the proper treatment of the gas. In this method of working the gas which leaves the Mond apparatus at about fifty degrees (50°) centigrade is heated to about five hundred degrees (500°) centigrade before it enters the cupola-generator, so that the watery vapor is converted to steam and the steam superheated and the carbonic-acid gas present is in condition to take up another portion of carbon and be reduced to carbonic oxid, while at the same time the gas is increased in volume by the generation of hydrogen gas and carbonic oxid from the superheated steam, and this without rapid loss of heat in the generator, because of the high heat to which the incoming gas and steam are raised before passing through the same. The finished gas comes from the generator and enters the annular pipes for reheating the incoming gas at a temperature of about six hundred degrees (600°) centigrade and passes to the holder in the neighborhood of eighty degrees (80°) to one hundred degrees (100°) centigrade, the remaining heat being absorbed by the incoming gas. The blast-gases which are burned generate a heat of about twelve hundred degrees (1200°) centigrade before passing in the annular space around the vertical return-pipes and escape at a temperature of about ninety degrees (90°) centigrade or are carried to a suitable steam-generator, being at a sufficient heat to generate the steam for operating the air-blast employed in the entire system and for running any necessary pumping-engines.

The resultant Mond gas produced is raised from an efficiency of about forty (40) per cent. combustible to an efficiency of over seventy-five (75) per cent. combustible, while at the same time its volume is largely increased, the resultant gas having over forty (40) per cent. carbonic oxid and over thirty (30) per cent. hydrogen and the remainder being hydrocarbons and nitrogen. These proportions will of course vary according to the fuel and the method of operating the system, and will also vary where other gases are treated in accordance with the invention, though it has great value even in treating of water-gases, which are correspondingly lower in nitrogen, because it enables a water-gas plant to be operated at such low temperature as to provide for the recovery of the by-products, which has not usually been the case, while the entire system can only lead to the enriching of the resultant gas. With Mond and like producer-gases the gas is raised to such high efficiency or percentage of combustible that they can be used for general distribution and combustion, therefore rendering it possible to use such gases for domestic heating purposes. By the apparatus described means are also provided for utilizing the heat both of the finished gases and of the blast-gases in such a way as to reheat the incoming gas after the removal of the by-products therefrom to a point close to the proper temperature for treatment in the generators, so that reversals of this part of the apparatus need only be made at long intervals and there is little or no waste of heat.

What I claim as my invention, and desire to secure by Letters Patent, is—

1. The method of making gas consisting in generating gas, separating the tar and ammonia from the resultant gas, and then passing the gas through a body of incandescent carbon, substantially as set forth.

2. The method of making gas consisting in generating gas, separating the tar and ammonia from the resultant gas and then reheating the gas and passing it through a body of incandescent carbon, substantially as set forth.

3. The method of making gas consisting in passing air through a body of carbon and so forming generator-gas, separating the tar and ammonia from the resultant generator-gas and then passing it through a body of incandescent carbon, substantially as set forth.

4. The method of making gas consisting in generating gas, separating the by-products from the resultant gas, passing the gas through a body of incandescent carbon and subsequently heating the gas in its course to the body of incandescent carbon by means of the outgoing or finished gas passing from that body, substantially as set forth.

5. The method of making gas consisting in generating gas, separating the ammonia from the resultant gas by means of a water shower, whereby the gas takes up steam and watery vapor and passing the combined gas, steam and watery vapor through a body of incandescent carbon, substantially as set forth.

6. The method of making gas consisting in generating gas, separating the ammonia from the gas by means of a water shower, whereby the gas takes up steam and watery vapor, and then heating up the gas, steam and watery vapor and passing the resultant gas and steam through a body of incandescent carbon, substantially as set forth.

7. The method of making gas consisting in generating gas, separating the by-products from the gas by passing the gas first upwardly through a water shower and then upwardly through an acidulated water shower, and then passing the gas together with the watery vapor taken up through a body of incandescent carbon, substantially as set forth.

8. The method of making gas consisting in generating gas, separating the by-products from the gas, and passing the gas through one body of incandescent carbon and at the same time blasting up another body of carbon and burning the resultant blast-gases and reheating the gas by means of the resultant products in its course to the body of incandescent carbon, substantially as set forth.

9. In gas-making apparatus, the combination of two generators and a series of vertical return-pipes leading thereto and surrounded by other pipes so as to form annular spaces around the inner pipes, and pipes leading from the generators and communicating with the annular spaces between the two sets of pipes, so as to heat the gases or vapors passing to the generators by the gases leading from the generators, and valve connections for reversing the currents between the generators, substantially as set forth.

10. The combination of two generators, a series of vertical return-pipes leading to the generators, said pipes having inclosing pipes forming annular spaces around the same, valve connections between the generators for carrying the gas to and from either generator and thence to the annular space around one or more of the pipes carrying gases passing to the generators, and carrying blast to either generator and the resultant blast-gases to the annular space around another of the pipes carrying gases passing to the generators, substantially as set forth.

11. In gas-making apparatus, the combination of two generators, a recuperative system communicating therewith having passages for the gases passing to the generators, passages leading from the generators for carrying the finished gas in course to heat part of the recuperative system for the gas on its way to the generators and passages leading from the generators to the remainder of the recuperative system for the gas on its way to the generators, substantially as set forth.

12. In gas apparatus, the combination of generators E and F, the valve systems K and M, the valve system K communicating with the bases of these said generators and having valves controlling the inlet of gas thereto and blast thereto, the valve system M communicating with the upper parts of the generators and having valves controlling the outlet of finished gas therefrom and of blast-gas therefrom, and a recuperative system for the gas on its way to the generators to part of which recuperative system the finished-gas pipe leads, and to part of which the blast-gas pipe leads, substantially as set forth.

13. In gas apparatus, the combination of generators E and F, the valve systems K and M, the valve system K communicating with the bases of these said generators and having valves controlling the inlet of gas thereto and blast thereto, the valve system M communicating with the upper parts of the generators and having valves controlling the outlet of finished gas therefrom and of blast-gas therefrom, and a series of vertical return-pipes $g'$ $g^2$ $g^3$ $g^4$ $g^5$ $g^6$, all of said pipes being inclosed in other pipes forming annular spaces around the same, and the pipe for finished gas communicating with some of those annular spaces, while the pipe for blast-gases communicates with other of said annular spaces, substantially as set forth.

In testimony whereof I, the said FRANK L. SLOCUM, have hereunto set my hand.

FRANK L. SLOCUM.

Witnesses:
ROBERT C. TOTTEN,
ROBT. D. TOTTEN.